United States Patent [19]
Cantrell et al.

[11] Patent Number: 5,357,613
[45] Date of Patent: Oct. 18, 1994

[54] TIME-DOMAIN BOUNDARY BUFFER METHOD AND APPARATUS

[75] Inventors: Jay T. Cantrell, Dallas; Edward R. Schurig, Plano, both of Tex.

[73] Assignee: Texas Instruments Incorporated, Dallas, Tex.

[21] Appl. No.: 945,547

[22] Filed: Sep. 16, 1992

[51] Int. Cl.⁵ .............................. G06F 13/14
[52] U.S. Cl. ........................ 395/250; 395/275
[58] Field of Search ........... 395/250, 550, 275, 425, 395/800; 364/238.6, 238.7, 238.8, 244.9, 271, 271.4, 950.3, 200

[56] References Cited

U.S. PATENT DOCUMENTS

| | | | |
|---|---|---|---|
| 4,974,241 | 11/1990 | McClure et al. | 377/116 |
| 4,984,194 | 1/1991 | Hogberg | 364/900 |
| 5,128,970 | 7/1992 | Murphy | 375/106 |

*Primary Examiner*—Dale M. Shaw
*Assistant Examiner*—Moustafa M. Meky
*Attorney, Agent, or Firm*—Mark E. Courtney; Wade James Brady; Richard L. Donaldson

[57] ABSTRACT

A method and apparatus for a circuit physically realizing a time domain boundary buffer circuit for capturing data signals transmitted on an asynchronous domain bus and transmitting the data signals to a synchronous domain is described. The circuit comprises a data ready circuit and a data buffer circuit. The data ready circuit comprises a first flip flop is coupled to an asynchronous input, a second flip-flop is coupled to the synchronous domain clock and the output of the first flip flop, and a third flip-flop is coupled to the synchronous domain clock and the output of the second flip-flop, the circuit having an output coupled to a circuit output terminal; the third flip flop for providing a synchronous output which reflects an event occurrence on the asynchronous input. Other embodiments are also described.

25 Claims, 1 Drawing Sheet

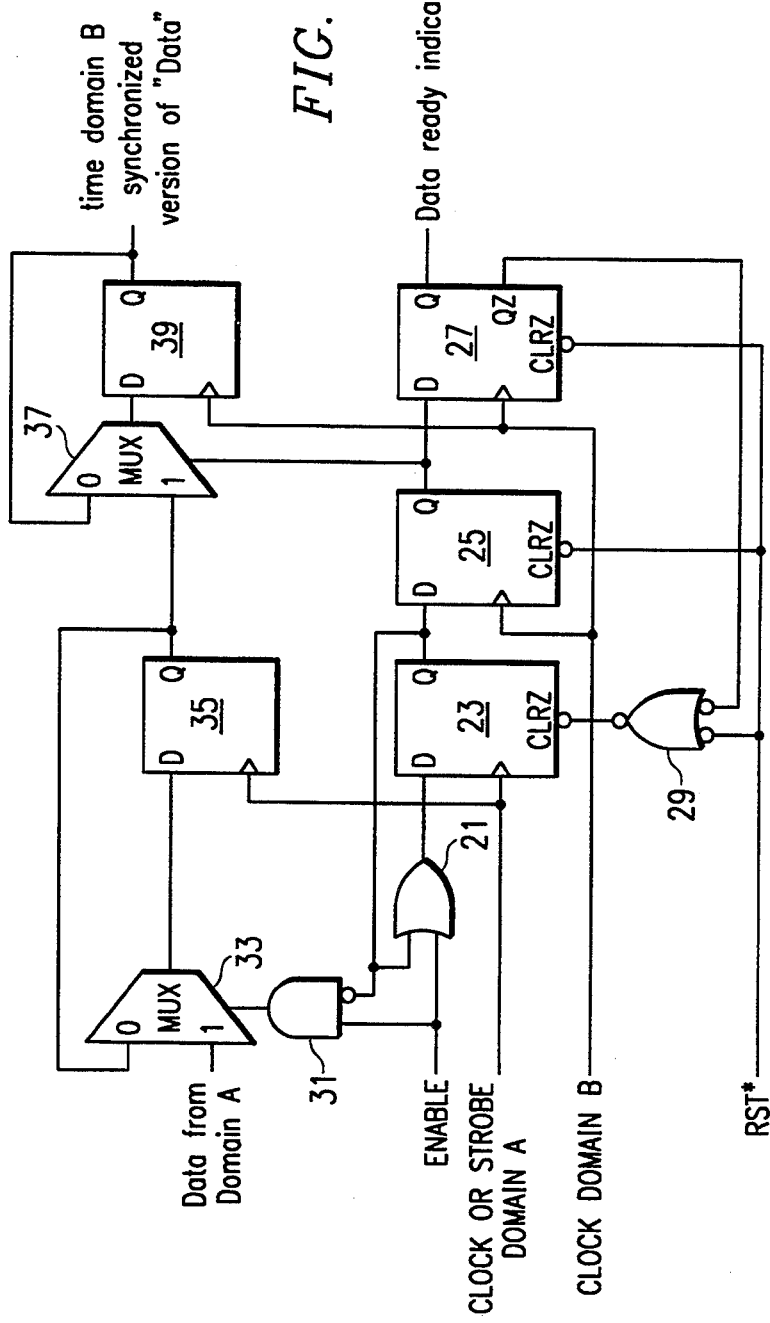
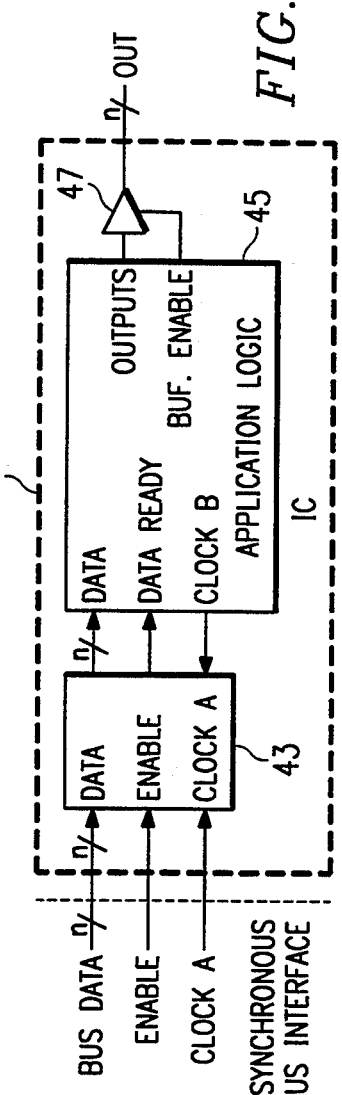

TIME-DOMAIN BOUNDARY BUFFER METHOD AND APPARATUS

RELATED APPLICATIONS

This application relates to co-pending U.S. patent application Ser. No. 07/945,548, entitled "Time Domain Boundary Bridge Method and Apparatus for Asynchronous Sequential Machines", TI-17202, filed Sep. 16, 1992; and to U.S. patent application Ser. No. 07/945,771, entitled "Time Domain Boundary Bridge Method and Apparatus", TI-17200, filed Sep. 16, 1992.

FIELD OF THE INVENTION

This invention relates generally to a method and apparatus for providing an improved circuit and method for coupling synchronous circuitry to an asynchronous bus or to an unrelated time domain bus, wherein the asynchronous bus has multiple data bits for use by the synchronous circuitry. In coupling synchronous devices to an asynchronous data bus, it is desirable that the detection of the asynchronous data bus signals occur without requiring that the asynchronous data bus signals have a specified duration and without requiring that the asynchronous transmitting device manually handshake with the receiving device, while achieving maximum throughput rates. The method and apparatus disclosed herein address these needs. The method and apparatus disclosed is applicable to circuits, integrated circuits and systems wherein observation, capture or detection of asynchronous data bus signals is required.

BACKGROUND OF THE INVENTION

Without limiting the scope of the invention, its background is described in connection with a synchronous circuit coupled to an asynchronous bus interface, such as an integrated circuit or circuit board coupled to an asynchronous system bus.

In systems using an asynchronous bus to couple devices, or in coupling two devices each clocked on unrelated clock time domains, the receiving device contains synchronous circuitry which must be able to reliably receive data from the asynchronous bus and capture data from it without missing the next data word to be sent on the bus. To accomplish this the asynchronous signals present at the bus interface must be synchronized to the time domain used within the synchronous receiving circuit.

Heretofore, in the design of asynchronous bus coupling circuitry, the typical approach to these problems was to provide a multiple ported FIFO buffer which couples the two time domains by capturing data from the bus, disabling further writes by the bus, and then allowing the synchronous circuitry to read the data out, which in turn enables subsequent writes by the bus logic. While effective in providing reliable operation, the FIFO approach of the prior art is gate count intensive and complex. Alternatively, the receiving device may handshake with the sending device through a system of data flags and wait signals which prevent the asynchronous data from changing or disappearing while the receiving device is reading it, essentially holding off subsequent data words. This approach has the disadvantage of tying up the bus, and thus slowing down the data rate, as well as requiring additional signal channels on the bus interface. In order for this prior art approach to work, it is required that the asynchronous event or signal being detected remain present until the synchronous receiving circuit acknowledges that it has successfully captured the data, a requirement which results in the bus being unavailable for extended time periods.

A need for an efficient method and apparatus for synchronizing asynchronous data signals, without requiring additional handshaking signals or unduly restricting the duration of such signals or events on an asynchronous bus, thus exists. Accordingly, improvements which overcome any or all of the above discussed problems are presently desirable.

SUMMARY OF THE INVENTION

Generally, and in one form of the invention, a circuit is described which implements a time domain boundary buffer circuit in a standard digital logic process. In the preferred embodiment of the invention, data signals on the asynchronous bus are accompanied by a single bit enable event or signal; these signals are coupled to a time domain boundary buffer circuit comprising a data ready circuit and a data buffer circuit. The data ready circuit comprises a flip flop or an S-R latch followed by two synchronization registers clocked on the synchronous circuitry clock, the flip flop being self cleared when the event has been synchronized so that the time domain buffer circuit is ready for a subsequent event. The data buffer circuit comprises a register coupled to the asynchronous bus, the register loads the data when the enable input signal hits the first flip flop of the data ready circuit, and holds the data in a register clocked by the sending device until the data ready circuit reaches the synchronized time domain, at that time the data is shifted into a second register clocked on the synchronous clock, the data is available at the output of the second register, and the first register is again available for capturing subsequent data words from the asynchronous bus.

An integrated circuit or IC is described for use in a multiple chip bus system, wherein user defined application logic from a standard ASIC or standard cell library is coupled to a plurality of input buffers containing the time domain boundary buffer circuitry. A system is described wherein each IC in the system contains the time domain boundary circuitry and the IC's are coupled together to communicate on a multiple device bus, such as the Futurebus+. The system thus created will exhibit superior throughput characteristics while providing low error rate data capture.

BRIEF DESCRIPTION OF THE DRAWINGS

In the drawings:

FIG. 1 depicts the time domain boundary buffer circuit of the invention;

FIG. 2 depicts an IC containing buffers incorporating the time domain boundary buffer circuit of the invention and further containing user specified application logic circuitry;

Corresponding numerals and symbols in the different figures refer to corresponding parts unless otherwise indicated.

DETAILED DESCRIPTION OF PREFERRED EMBODIMENTS

FIG. 1 depicts the time domain boundary buffer circuit of the invention in an embodiment suitable for use in transmitting data from one time domain, Domain A, to a second synchronous time domain, Domain B. The bus data signals are placed on the input signal labeled "Data from Domain A". The clock from the transmitting device or the bus is placed on the input labeled "Clock Domain A". The data ready indicator from the transmitting device is placed on the input labeled "Enable". A reset signal for use in clearing all registers is coupled to the input labeled RST*. The outputs comprise a flag synchronized to the synchronous clock of Domain B and labeled "Data ready indicator", and a data bus output synchronized on the Domain B synchronous clock and labeled "Timed domain B synchronized version of Data".

The strobe input is coupled through OR gate 21 to the edge triggered D flip flop 23, which has its clock input coupled to the clock input labeled "Clock Domain A". The output of flip flop 23 is then coupled to the two clock synchronizer comprised of flip flop 25 and flip flop 27, which are both clocked on the synchronous clock labeled Clock Domain B. The QZ output of flip flop 27 is coupled to the clear input of flip flop 23 through a NOR gate 29, and the combination forms a self clearing circuit to make the Enable input available for subsequent data words. OR gate 21, flip flops 23, 25 and 27 and NOR gate 29 form a time domain boundary bridge circuit as described in detail in co-pending application U.S. patent application Ser. No. 07/945,771, titled "Time Domain Boundary Bridge Circuit Method and Apparatus", and herein incorporated by reference.

The data signals to be captured are placed on the input labeled "Data from Domain A" and coupled to the input of multiplexer 33. The output of multiplexer 33 is coupled to the input of flip-flop 35, which is clocked on the clock from the Domain A transmitting device. The output of flip flop 35 is coupled through multiplexer 37 to the input of flip-flop 39, which is clocked on the synchronous clock for time domain B, which is labeled Clock Domain B. The output of the flip-flop 39 is data synchronized on the time domain B clock and labeled "Time domain B synchronized version of 'Data'".

In operation, the time domain boundary bridge circuitry of flip-flops 23, 25, 27 and logic gates 21 and 29 is used to control the capture of the data signals into the registers. First, flip-flop 23 captures an Enable signal from the time domain A or asynchronous bus, and OR gate 21 operates to insure that the captured signal remains in flip-flop 23 until it is cleared by the time domain B circuitry. The Enable input also controls multiplexer 33 and causes the data present on the "Data from Domain A" input to be loaded into register 35 on the time domain A clock. After the data is loaded into register 35, register 35 will recirculate the data until the enable signal captured in flip flop 23 is cleared out by the action of gate 29. AND gate 31 makes sure this recirculation occurs by controlling multiplexer 33 such that no new data is loaded into register 35 until the captured enable signal is cleared out of register 23. The asynchronous bus is required to provide the Enable signal so that the data on the bus is only captured when it is valid, i.e., when none of the bits are changing. A strobe or data ready signal is generally provided when a bus carries multiple bits so that the receiving device knows when to sample the data, thus the design of the invention is compatible with most known asynchronous or multiple clock domain bus systems.

At this point, data is captured in register 35 and ready for synchronization to the synchronous clock domain, clock domain B. Register 23 contains an enable bit captured from the bus and likewise available for synchronization to clock domain B. The circuit of the invention advantageously uses the synchronization of the enable signal to control the capture of the data into the data register clocked on the domain B clock, thus reducing the required logic over the prior art and providing an error free version of the data in time domain B.

This is accomplished by using the output of flip-flop 25 to control multiplexer 37, which in turn controls the loading of flip-flop 39. On the first time domain B clock cycle after the enable signal is captured into flip-flop 23, the output of flip-flop 25 will rise to a logic high state. The high signal will cause multiplexer 37 to pass the output of register 35 to the input of register 39. On the second clock cycle of time domain B, the output of flip-flop 27 will rise to a logic high and indicate that data is ready to the receiving synchronous circuitry. Simultaneously, the flip-flop 39 will output the captured data.

As the data ready indication signal goes high, the QZ output of flip-flop 27 will cause NOR gate 29 to asynchronously clear the output of register 23. The third clock cycle will then clock a low value into flip-flop 25, which will cause multiplexer 37 to recirculate. This is necessary because each Data ready indicator signal will appear at the output of flip flop 27 for two clock cycles in time domain B, as the low logic level is clocked through the two clock synchronizer of flip-flops 25 and 27. As the Data ready signal is high for two clocks, the data at the output from register 39 must be kept valid for those same two clock cycles to insure that the data and the data ready signal always correspond.

Note that as soon as the flip-flop 23 is cleared by the self clearing logic of NOR gate 29 and flip-flop 27, the circuit is ready to capture a new data indicator on the Enable input and the new data signals at multiplexer 33 and register 35. In a system operating at maximum rates, the data ready indicator will always be high, because as soon as flip flop 23 is cleared it is set again by a new data word on the bus.

The time domain boundary bridge circuitry comprising flip-flops 23, 25 and 27 and logic gates 21 and 29 may be replaced by any of the alternative arrangements as detailed in co-pending patent application U.S. patent application Ser. No. 07/945,548, titled "Time-Domain Bridge Method and Apparatus For Asynchronous Sequential Machines", and herein incorporated by reference. For example, flip-flop 23 and OR gate 21 may be replaced by an S-R latch for use in purely asynchronous systems wherein no clock signal is available to the receiving circuitry. Flip-flop 35 would be "clocked" on a delayed version of the Enable signal in that embodiment. In all other respects the circuit would operate in the same manner as shown in FIG. 1. Alternative equivalent circuitry could replace each of the elements in FIG. 1, for example, the edge triggered flip flops could be replaced by master slave dual phase clocked latches. Other equivalent circuitry alternatives will be obvious to the practitioner skilled in the art, and all such alternatives are comprehended by this specification and the claims herein.

FIG. 2 depicts an integrated circuit coupled to an asynchronous bus interface and including the time domain boundary buffer circuitry of the invention. IC 41 comprises time domain boundary buffer 43, user specified application logic block 45, and output buffers 47. In operation, the user specified application logic may be logic implementing any well known function, and may contain RAM, ROM, EPROM, microprocessor or programmable logic clocked on the synchronous clock of time domain B. The asynchronous bus interface is coupled between IC 41 and a transmitting device having an unrelated time domain. The logic in user specified application logic block 45 is coupled to the data signals on the asynchronous bus interface through the use of the time domain boundary buffer circuit 43, and enables the user specified logic to reliably receive data transmitted on the asynchronous bus at a rate which allows maximum data transfers.

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic materials families, as well as in optical-based or other technology-based forms and embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A time domain boundary buffer circuit for coupling a first time domain bus to a second time domain, comprising:
   a plurality of data inputs coupled to said first time domain bus;
   a strobe input coupled to a strobe signal of said first time domain bus;
   a clock input coupled to a clock signal of said first time domain bus;
   a data ready circuit coupled to said strobe input and to said clock input, for capturing transitions at said strobe input responsive to said clock input;
   a data buffer circuit coupled to said data inputs, and said strobe input for synchronizing data from said first time domain bus into said second time domain; and
   said data buffer circuit receiving said data at said data inputs in response to a transition at said strobe input, and subsequently synchronizing said data into said second time domain.

2. The time domain boundary buffer circuit of claim 1, wherein said data ready circuit comprises:
   a first clocked memory coupled to said strobe signal and to said clock signal from said bus, and having an output;
   a second clocked memory coupled to said first clocked memory and further coupled to a second clock signal related to said second time domain, said second clocked memory capturing the output of said first clocked memory responsive to said second clock signal, and having an output;
   a third clocked memory coupled to said second clocked memory and to said second clock signal, said third clocked memory capturing the output of said second clocked memory responsive to a transition in said second clock signal;
   self clearing logic coupled to the output of said third clocked memory and of a clear input to said first clocked memory, said self clearing logic clearing said first clocked memory on the transition of the output of said third clocked memory; and
   said data ready circuit capturing a transition at said strobe input in said first clocked memory responsive to the clock signal from said bus, and subsequently synchronizing said captured transition to said second clock signal.

3. The data ready circuit of claim 2, wherein said self clearing logic comprises a logic NOR gate.

4. The data ready circuit of claim 2, wherein said self clearing logic comprises a logic NAND gate.

5. The data ready circuit of claim 2, wherein each of said clocked memories comprises an edge triggered flip flop circuit.

6. The data ready circuit of claim 2, wherein each of said clocked memories comprises a master slave dual phase flip flop.

7. The time domain boundary buffer circuit of claim 1, wherein said data buffer circuit comprises:
   a first clocked memory coupled to said data inputs from said first time domain bus and being clocked by said clock from said first time domain bus, and having a hold function;
   a second clocked memory coupled to said first clocked memory and having a hold function, said second clocked memory being clocked by a clock signal related to said second time domain; and
   the first clocked memory selectively capturing said data signals from said first time domain bus responsive to said strobe signal from said first time domain bus and said second clocked memory selectively receiving said captured data from said first clocked memory responsive to said clock signal from said second time domain.

8. The data buffer circuit of claim 7, wherein said first and second clocked memories each comprise edge triggered flip-flop circuits.

9. A method for capturing data signals from one time domain and synchronizing them to a second time domain, comprising the steps of:
   providing one or more data inputs coupled to a bus clocked on a first time domain;
   providing strobe input coupled to an enable signal of said bus;
   providing a clock input coupled to a clock signal of said bus;
   providing a data ready circuit coupled to said enable input and to said clock input, said data ready circuit capturing transitions at said enable input responsive to said clock signal;
   providing a data buffer circuit coupled to said data inputs, said data buffer circuit synchronizing data from said bus into a second time domain; and
   receiving said data into said data buffer circuit in response to a transition at said enable input captured in said data ready circuit, and operating said data buffer circuit to synchronize said received data into said second time domain.

10. The method of claim 9, wherein said step of providing a data ready circuit further comprises the steps of:

providing a first clocked memory coupled to said enable input and to said clock input from said bus, and having an output;

providing a second clocked memory coupled to said output of said first clocked memory and further coupled to a second clock signal related to said second time domain, said second clocked memory capturing the output of said first clocked memory responsive to said second clock signal, said second clocked memory having an output;

providing a third clocked memory coupled to said output of said second clocked memory and to said second clock signal, said third clocked memory capturing the output of said second clocked memory responsive to a transition in said second clock signal, said third clocked memory having an output;

providing self clearing logic coupled to the output of said third clocked memory and of a clear input to said first clocked memory, said self clearing logic clearing said first clocked memory on the transition of the output of said third clocked memory; and capturing a transition at said enable input in said first clocked memory responsive to said first clock signal from said bus, and subsequently synchronizing said captured transition to said second clock signal.

11. The method of claim 10, wherein the step of providing self clearing logic comprises the step of providing a logic NOR gate coupled between the output of said third clocked memory and said clear input of said first clocked memory, and further coupled to a reset input terminal from said bus, said NOR gate selectively clearing the first clocked memory responsive to a transition in the output of said third clocked memory, and alternatively responsive to a transition at said reset input terminal.

12. The method of claim 11, wherein said steps of providing first, second and third clocked memories each comprise the step of providing an edge triggered flip flop circuit.

13. The method of claim 11, wherein said steps of providing first, second and third clocked memories each comprise the step of providing a master slave dual phase clock flip flop circuit.

14. The method of claim 9, wherein said stop of providing said data buffer circuit comprises the steps of:

providing a first clocked memory coupled to said data inputs from said bus and being clocked by said clock input from said bus, said first clocked memory having a hold function and an output;

providing a second clocked memory coupled to said output of said first clocked memory and having a hold function, said second clocked memory being clocked by a clock signal related to said second time domain, said second clocked memory having an output; and selectively capturing one or more data from said bus in said first clocked memory responsive to said strobe signal from said bus, and subsequently capturing said data from said first clocked memory into said second clocked memory responsive to a second clock signal from said second time domain.

15. The method of claim 14 and further comprising the step of providing said second clocked memory to receive data from said first clocked memory.

16. The method of claim 15 wherein said steps of providing first and second clocked memories each comprise the step of providing a master slave dual phase clocked flip-flop circuit.

17. The method of claim 14 wherein said steps of providing first and second clocked memories each comprise the step of providing an edge triggered flip-flop circuit.

18. An integrated circuit having an interface for receiving data from an asynchronous bus, comprising:

a time boundary buffer circuit coupled to said asynchronous bus, for synchronizing data received from said asynchronous bus;

a strobe input coupled to a strobe signal from said asynchronous bus;

user application circuitry coupled to said time boundary buffer circuit and to outputs of said integrated circuit;

a clock input coupled to said time boundary buffer circuit and to said user application circuitry, to provide a clock signal related to a synchronous time domain within said integrated circuit; and said user application circuitry selectively receiving and operating on data transmitted on said asynchronous bus by using said time boundary buffer circuit for synchronizing said data into said synchronous time domain responsive to said strobe signal.

19. The integrated circuit of claim 18, wherein said user application circuitry comprises a memory.

20. The integrated circuit of claim 18, wherein said user application circuitry comprises an arithmetic logic function.

21. The integrated circuit of claim 18, wherein said user application circuitry comprises a user programmable logic array.

22. The integrated circuit of claim 18, wherein said user application circuitry comprises a processor.

23. The integrated circuit of claim 18, wherein said time boundary buffer circuit comprises:

data inputs coupled to said asynchronous bus;

a strobe input coupled to said strobe signal of said asynchronous bus;

a data ready circuit coupled to said strobe input to capture transitions of said strobe signal;

a data buffer circuit coupled to said data inputs, said data buffer circuit synchronizing data from said bus into said synchronous time domain; and said time boundary buffer circuit receiving said data at said data inputs into said data buffer circuit in response to a transition at said strobe input, and further synchronizing said data into said synchronous time domain.

24. The time domain boundary buffer circuit of claim 23 wherein said data ready circuit comprises:

a first memory coupled to said strobe input for capturing said strobe signal, and having an output;

a second memory coupled to said first memory and further coupled to said clock signal, to capture the output of said first clocked memory responsive to said clock signal, and having an output;

a third memory coupled to said second memory and to said clock signal, said third memory capturing the output of said second memory responsive to a transition in said clock signal; and said data ready circuit capturing a transition at said strobe input and subsequently synchronizing said captured transition to said clock signal.

25. The time domain boundary buffer circuit of claim 23, wherein said data buffer circuit comprises:

a first clocked memory coupled to said data inputs from said asynchronous bus and being clocked by a second clock input from said asynchronous bus, and having a hold function;

a second clocked memory coupled to said first clocked memory and having a hold function, said second clocked memory being clocked by said clock signal related to said synchronous time domain; and the first clocked memory selectively capturing data from said asynchronous bus responsive to said strobe signal from said asynchronous bus and said second clocked memory selectively receiving said data from said first clocked memory responsive to said clock signal from said synchronous time domain.

* * * * *